Aug. 10, 1948.   B. BAXTER ET AL   2,446,626
SAFETY VALVE
Filed June 6, 1944

INVENTORS
Benjamin Baxter
Samuel M. Kandarian
BY
ATTORNEYS

Patented Aug. 10, 1948

2,446,626

UNITED STATES PATENT OFFICE 2,446,626

SAFETY VALVE

Benjamin Baxter and Samuel M. Kandarian, Fowler, Calif.

Application June 6, 1944, Serial No. 538,931

6 Claims. (Cl. 277—29)

The present invention relates generally to a safety valve for use in connection with gas welding systems, and in particular the invention is directed to, and it is an object to provide, a safety valve for use between the high pressure gas tank and the pressure regulator of such a welding system; the safety valve being operative to prevent any high pressure surge against the pressure regulator when the pressure from the tank is initially turned into said system. The safety valve is thus effective to prevent damage to the equipment, and particularly the pressure regulator, and avoids possible injury to the operator.

A further object of this invention is to incorporate a safety valve, for the above purpose, in the manually controlled main tank valve as a unitary part thereof.

Another object of this invention is to provide a safety valve, as in the preceding paragraph, which automatically functions, when the main tank valve is initially and partly opened, to check any pressure surge and permit only of gradual increase of the pressure beyond said main tank valve, said safety valve being mechanically and positively moved to an inoperative or non-restrictive position upon continued opening movement of said main tank valve to full open position.

A further object of the invention is to produce a simple and inexpensive device, and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
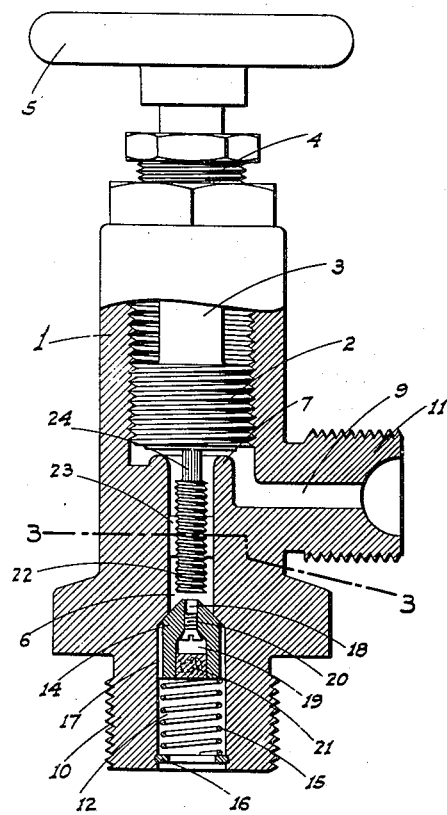
Figure 1 is an elevation, mainly in section, of a main tank valve embodying the present invention; the main valve being shown in partly open position, and the safety valve shown in pressure equalizing position.

Referring now more particularly to the characters of reference on the drawings, the numeral 1 indicates an axially elongated main valve body into which a main valve head 2 is threaded from one end; said head being formed on the inner end of a stem 3 which projects axially out of the upper end of the body through a packing gland 4.

A hand wheel 5 is fixed to the outer end of the stem 3 for the control of the valve head 2.

The main body 1 includes an axial bore 6 which extends from the end of said body opposite hand wheel 5 inwardly to a termination at and in communication with an annular upwardly facing valve seat 7 formed for cooperation with the main valve head 2; the latter including a valve washer 8 adapted to engage with the seat 7 upon axially inward movement of said head 2. An outlet passage 9 enters the body 1 laterally, and communicates with the inner end of bore 6 when the main valve head 2 is in open position. A threaded fitting 10 surrounds the lower end of bore 6 and is adapted for connection with the high pressure gas tank of the welding system, while the outlet passage 9 extends through a lateral fitting 11 which is adapted for connection with the conduit (not shown) which leads to the pressure regulator of said system.

The above described structure comprises the main tank valve of a gas welding system, and is substantially conventional. To this main tank valve the present invention is incorporated as follows:

The lower end portion of the bore 6 is enlarged, as at 12, to form a downwardly facing annular valve seat 13. A plug valve 14 is slidably disposed in the enlarged bore 12, and the inner end of said valve is of frusto-conical configuration, as shown, for cooperative matching engagement with the downwardly facing valve seat 13; the valve 14 initially being closed against seat 13 by means of a compression spring 15 engaged between the lower end of said valve and a stop collar 16 press-fitted into the enlarged bore 12.

Exteriorly the slidable plug valve 14 is formed with a plurality of circumferentially spaced longitudinally extending channels 17 which permit of unrestricted pressure flow by said valve when the latter is open relative to the seat 13.

The valve 14 includes an axial bore 18 therethrough; the lower or outer end portion 19 of said bore being enlarged to receive the head of a bleed control screw 20 which is threaded into the bore 18 from the enlarged portion 19 thereof, and which controls and limits pressure flow through the valve 14 when the latter is closed. A filter 21 in the enlarged portion 19 or bore 18 prevents access of foreign matter into said valve.

The valve 14 will preferably be constructed in the manner shown in detail in our co-pending application, Serial No. 520,450, filed January 31, 1944, now Patent Number 2,389,887, granted November 27, 1945.

An axial push rod 22 is threaded through a spider 23 in bore 6 intermediate valve seats 7 and 13; said push rod including a non-circular, axial shank 24 which projects upwardly through valve seat 7 into a matching non-circular, axial bore 27 in the main valve head 2. The main valve head 2 and the push rod 22 are formed with opposite threads; the head 2 preferably being right-hand threaded, while the push rod 22 is left-hand threaded.

Figure 2:
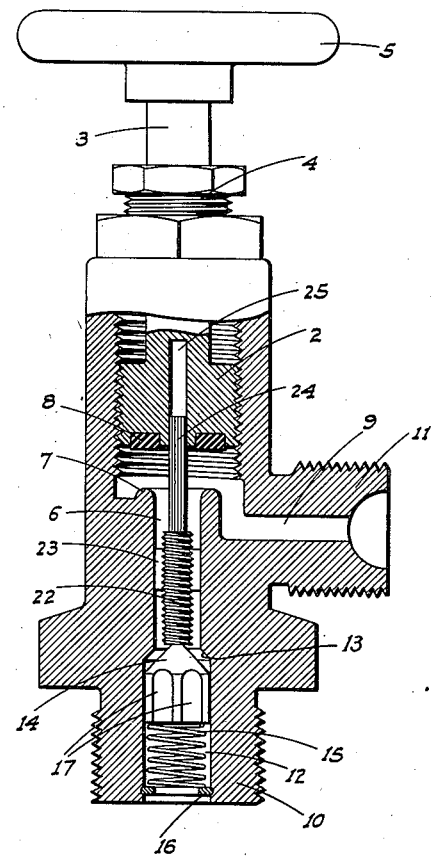
Figure 2 is a similar view, but illustrates the main valve, as well as the safety valve, in open position.
Figure 3:
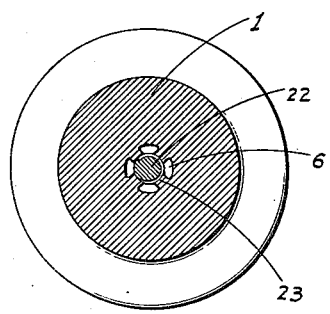
Figure 3 is a cross section on line 3—3 of Fig. 1.

The lower end of the push rod 22 is clear of the inner, frusto-conical end of the slidable plug valve 14 when the main valve head 2 is in valve closing position with the washer 8 seated against the valve seat 7. When the hand wheel 5 is initially turned to a limited extent by the operator and causes partial opening of the main valve by moving washer 8 slightly away from seat 7, the push rod 22 turning on its reverse threads approaches but still remains short of the plug valve 14, as shown in Fig. 1, with the following result:

High pressure from the tank bleeds through the slidable but closed plug valve 14 into the bore 6 thereabove, through the partially open main valve, and thence into outlet passage 9, equalizing the pressure in the system on both sides of the main tank valve, while preventing any high pressure surge. With continued rotation, by the operator, of the hand wheel 5 in a main valve opening direction, the head 2, together with the washer 8, moves to full open position, as shown in Fig. 2. When this occurs the push rod 22, due to its reverse threading, advances downwardly a sufficient distance to engage and push the valve 14 to its full open position, whereupon the pressure flow through the device is unrestricted. As is evident, downward movement of the push rod on its reverse threads upon upward movement of the head 2 is made possible through the medium of the non-circular shank 24 riding in the matching bore 25.

When the head 2 is again returned to closing position relative to the seat 7, the push rod 22 retracts and permits the valve 14 to close, ready for the next valve opening operation.

Figure 4:
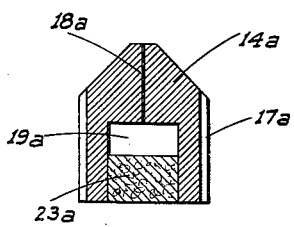
Figure 4 is a sectional elevation of a modified form of the safety valve, detached.

In Fig. 4 there is illustrated a modified form of the plug valve; the valve here being shown at 14a and including, as previously, side channels 17a. Here, however, the flow restricting means through the valve comprises an extremely restricted axial bore 18a which extends through said valve from an enlarged bore portion 19a to the apex of said valve. The enlarged bore portion 19a which opens from the valve in the direction of the tank includes therein a filter 21a, to assure against foreign matter gaining access and plugging at restricted bore 18a. When this form of valve is used in the device, it functions in exactly the same manner as described in connection with the valve 14.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A safety valve comprising a body having a bore therein, opposed valve seats in said bore, a manually controlled valve mounted in the body for opening and closing movement relative to said one valve seat, another valve mounted in the body for opening and closing movement relative to the other seat, said valve being initially closed and said other valve having a restricted flow passage therethrough, and means actuated by said manually controlled valve operative to cause opening of said other valve in one direction after predetermined opening movement of said manually controlled valve in the opposite direction; said manually controlled valve being threaded into the body for rotation, and said means including a push rod threaded into the body for counter-rotation to engage and open said other valve, and an instrumentality connected between said manually controlled valve and the push rod arranged to impart rotation of the latter without restricting opening movement of either valve.

2. A safety valve comprising a body having a bore therein, oppositely facing axially alined valve seats in said bore, a main valve threaded into the body for opening or closing movement relative to one seat, another valve slidably mounted in the body for opening or closing movement relative to the other seat, said valves being initially closed, means to bleed pressure past said other valve toward the main valve, an axially disposed push rod threaded in the bore between said valve seats without restricting flow therebetween, said push rod being threaded counter to the main valve whereby rotation of said push rod in the same direction as the main valve rotates to open, causes said push rod to engage and open said other valve, axially extensible means connected between the main valve and push rod to rotate the latter when said main valve is rotated, and hand means to rotate said main valve.

3. A valve as in claim 2 in which said axially extensible means comprises a non-circular shank cooperatively engaged in a matching bore.

4. A safety valve comprising a body having a bore therein, oppositely facing axially alined valve seats in said bore, a main valve threaded into the body for opening or closing movement relative to one seat, another valve slidably mounted in the body for opening or closing movement relative to the other seat, said valves being initially closed, means to bleed pressure past said other valve toward the main valve, an axially disposed push rod threaded in the bore between said valve seats without restricting flow therebetween, said push rod being threaded counter to the main valve whereby rotation of said push rod in the same direction as the main valve rotates to open, causes said push rod to engage and open said other valve, a non-circular shank projecting axially from said push rod into a matching bore in the main valve, and hand means to rotate the main valve.

5. A safety valve having a straight bore therein, oppositely facing valve seats in said bore, a main valve threaded into the body for opening and closing movement relative to one seat, another valve slidably mounted in the body for opening and closing movement relative to the other seat, a spring urging said other valve toward the corresponding seat, both valves being initially closed, a spider in the bore between the seats, an axial push rod threaded through said spider, the push rod being threaded counter to the main valve, a non-circular shank projecting axially from the push rod toward the main valve, the latter having a matching axial bore therein in which said shank slidably engages, the push rod engaging and opening said other valve upon rotation of the main valve in a direction to open the same but only after partial opening thereof, and hand means to rotate the main valve.

6. A safety valve comprising a casing having an inlet and an outlet, a valve seat adjacent the inlet, a valve seat adjacent the outlet, a valve for the inlet, yieldable means normally holding the inlet valve against its seat, a valve for the outlet, manually operable means for respectively moving the outlet valve against and away from its seat, open restricted passage means leading from one side of the inlet valve to the other whereby when the outlet valve is moved away from its seat, communication will be opened from the inlet through the restricted passage means and to the outlet, and means responsive to the movement of the outlet valve and operable to engage and open the inlet valve after the outlet valve has been moved away from its seat a predetermined distance.

BENJAMIN BAXTER.
SAMUEL M. KANDARIAN.

REFERENCES CITED

The following references are of record in the file of this patent:

UNITED STATES PATENTS

| Number | Name | Date |
|---|---|---|
| 714,747 | Rowley | Dec. 2, 1902 |
| 1,072,796 | Vance | Sept. 9, 1913 |
| 1,230,499 | Matheson | June 19, 1917 |
| 2,308,643 | Bucknam | Jan. 19, 1943 |
| 2,336,282 | Mueller | Dec. 7, 1943 |

FOREIGN PATENTS

| Number | Country | Date |
|---|---|---|
| 7,878 | Great Britain | 1894 |